(12) United States Patent
Yen et al.

(10) Patent No.: US 10,094,421 B2
(45) Date of Patent: Oct. 9, 2018

(54) SLIDER OF SLIDE MODULE

(71) Applicant: SYNCMOLD ENTERPRISE CORP., New Taipei (TW)

(72) Inventors: Ching-Hui Yen, New Taipei (TW); Feng-Rong Liu, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 15/437,867

(22) Filed: Feb. 21, 2017

(65) Prior Publication Data
US 2018/0066706 A1  Mar. 8, 2018

(30) Foreign Application Priority Data
Sep. 6, 2016 (TW) .............................. 105213672 U (51) Int. Cl.
| | |
|---|---|
| *F16C 33/20* | (2006.01) |
| *F16C 29/02* | (2006.01) |
| *F16C 25/02* | (2006.01) |
| *F16C 29/00* | (2006.01) |
| *B23P 15/00* | (2006.01) |

(52) U.S. Cl.
CPC .......... *F16C 33/205* (2013.01); *B23P 15/003* (2013.01); *F16C 29/005* (2013.01); *F16C 29/02* (2013.01); *F16C 33/201* (2013.01); *F16C 33/208* (2013.01); *F16C 2208/36* (2013.01); *F16C 2208/78* (2013.01); *F16C 2220/04* (2013.01); *Y10T 29/4998* (2015.01); *Y10T 29/49641* (2015.01)

(58) Field of Classification Search
CPC ...... F16C 29/005; F16C 29/02; F16C 33/201; F16C 33/208; F16C 33/205; F16C 2208/36; F16C 2208/78; F16C 2220/04; F16C 29/12; F16C 25/02; H04M 1/0237; B23P 15/003; Y10T 29/49641; Y10T 29/4998
USPC ....... 384/20, 23, 26, 37, 42; 248/298.1, 423, 248/429; 360/234.6, 235.1, 235.8, 235.9; 312/334.37
See application file for complete search history.

(56) References Cited

U.S. PATENT DOCUMENTS

| | | | | |
|---|---|---|---|---|
| 3,649,090 A | * | 3/1972 | Dutot ...................... | F16C 29/02 384/23 |
| 5,378,006 A | * | 1/1995 | Stuart .................... | B62D 21/14 280/149.2 |
| 5,673,771 A | * | 10/1997 | Rivera .................... | B66B 7/022 104/106 |

(Continued)

FOREIGN PATENT DOCUMENTS

| | | | | |
|---|---|---|---|---|
| DE | 4102708 A1 | * | 8/1991 | ............ F16C 29/005 |
| DE | 10157587 A1 | * | 6/2003 | ............. B65D 19/44 |

(Continued)

*Primary Examiner* — Marcus Charles
(74) *Attorney, Agent, or Firm* — Muncy, Geissler, Olds & Lowe, P.C.

(57) ABSTRACT

A self-lubricating slide module is provided. The slide module comprises a rail and a slider. The slider includes a metal member and a plastic member, wherein the metal member includes at least one engaging structure. The plastic member binds to the metal member by injection molding, so as to cover at least a portion of the metal member, and be embedded into the engaging structure to firmly engage to each other.

11 Claims, 12 Drawing Sheets

(56) References Cited

U.S. PATENT DOCUMENTS

| | | | | |
|---|---|---|---|---|
| 5,681,116 A * | 10/1997 | Lin | ............... | A47B 21/0314 |
| | | | | 384/42 |
| 5,890,811 A * | 4/1999 | Bryson | ............ | F16C 29/02 |
| | | | | 384/42 |
| 5,938,340 A * | 8/1999 | Brodersen | ......... | F16C 29/12 |
| | | | | 384/40 |
| 6,158,123 A * | 12/2000 | Bryson | ............ | B23P 15/00 |
| | | | | 29/434 |
| 7,370,920 B2 * | 5/2008 | Wang | ............ | H05K 7/1489 |
| | | | | 312/334.11 |
| 7,594,755 B2 * | 9/2009 | Ropp | ............ | B60N 2/075 |
| | | | | 384/34 |
| 7,653,966 B2 * | 2/2010 | Quinn | ............ | E05D 15/0647 |
| | | | | 16/87.6 R |
| 8,267,581 B2 * | 9/2012 | Li | ................... | G06F 1/1675 |
| | | | | 248/424 |
| 9,376,848 B2 * | 6/2016 | Terno | ............ | E05D 15/0652 |
| 2005/0215298 A1 * | 9/2005 | Lee | ............... | H04M 1/0237 |
| | | | | 455/575.4 |
| 2008/0102908 A1 * | 5/2008 | Chen | ............ | H04M 1/0237 |
| | | | | 455/575.4 |
| 2008/0137232 A1 * | 6/2008 | Wadsworth | ....... | G11B 33/10 |
| | | | | 360/234.6 |

FOREIGN PATENT DOCUMENTS

| | | | | |
|---|---|---|---|---|
| KR | 20080109286 A | * | 12/2008 | ......... H04B 1/38 |
| TW | 486551 B | | 5/2002 | |

\* cited by examiner

SLIDER OF SLIDE MODULE

CROSS REFERENCE TO RELATED APPLICATION

This application claims the benefits of the Taiwan Patent Application Serial Number 105213672, filed on Sep. 6, 2016, the subject matter of which is incorporated herein by reference.

BACKGROUND OF THE INVENTION

1. Field of the Invention

The present invention relates to a slider of a slide module; particularly, to a slider of a self-lubricating slide module.

2. Description of Related Art

A linear sliding module as disclosed in Taiwan Patent No. 486551 is composed of a rail. The slider sliding along a longitudinal direction is supported by a guide shoe, wherein the slider is made of metal and the guide shoe is made of plastic. The plastic guide shoe may directly contact the sliding module and slide smoothly without lubricating oil or balls.

However, according to the linear sliding module disclosed in the prior art, the slider is inserted into the guide shoe. Therefore, the guide shoe and the slider may separate due to the poor binding between plastic and metal. In addition, the slider and the guide shoe in the prior art are manufactured individually before the assembling process. Accordingly, the manufacturing process is complicated and the production cost is raised.

Accordingly, developing a novel self-lubricating slide module is urgently needed in this field wherein a slider of the slide module is formed by embedding a metal member into a plastic member through injection molding. Therefore, the metal member and the plastic member of the slider may engage with each other and present firm binding property, and the manufacturing process is also simplified. The self-lubricating function provided by the plastic member allows the slider to smoothly slide in the rail without applying the lubricating oil or disposing the balls.

SUMMARY OF THE INVENTION

The object of the present invention is to provide a self-lubricating slide module. The slider is manufactured by embedding a metal member into a plastic member by injection molding method, and the slider contacts the rail through its plastic member. The slider may smoothly slide along the rail due to the low friction between the plastic member and the rail, and the metal member may reinforce the strength of the slider.

To achieve the abovementioned objects, a slider of a slide module is provided in the present invention, wherein the slider is slidably disposed in a rail extending in a longitudinal direction. The slider comprises a metal member including at least one engaging structure; and a plastic member binding to the metal member by injection molding, covering at least a portion of the metal member, and being embedded in the engaging structure to firmly engage to the metal member, wherein the plastic member of the slider contacts the rail, and the slider slides along the longitudinal direction with respect to the rail.

In addition, the plastic member binds to the metal member by injection molding and covers at least a portion of the metal member; or the metal member may be embedded entirely into the plastic member as long as the slider contacts to the rail through the plastic member which is not particularly limited.

In the present invention, the engaging structure is a groove, a notch, a protrusion, a through hole, or combinations thereof.

However, the location and the number of the engaging structure is not particularly limited, the engaging structure may be formed as a groove, a notch, a protrusion, a through hole, or combinations thereof at anywhere of the metal member.

In the present invention, the metal member includes a main board, two long-side wings, and two short-side wings, wherein the engaging structure is formed on the main board, the long-side wings, or the short-side wings.

In one embodiment of the present invention, the metal member further includes at least one bending part formed on the main board, the long-side wings, or the short-side wings, wherein the bending part includes at least one bending corner.

In one preferred embodiment of the present invention, the main board includes a recess which is formed from one surface to another surface of the main board. In addition, two engaging structures are formed on each side of the recess parallel to long-side wing respectively, wherein the engaging structures are the through-holes.

In a preferred embodiment of the present invention, when the bending part is formed on the long-side wing, the bending part extends along the longitudinal direction; when the bending part is formed on the short-side wing, the bending part extends along a direction perpendicular to the longitudinal direction; and when the bending part is formed on the main board, the bending part may extend along the longitudinal direction or along the direction perpendicular to the longitudinal direction.

In one embodiment of the present invention, the engaging structure is formed on the bending part and the engaging structure is preferably a through hole.

In the present invention, the plastic member is formed of a thermoplastic plastic. In a preferred embodiment of the present invention, the thermoplastic plastic is at least one selected from the group consisting of polyaryletherketone, polyethylene, and modified polyethylene. For example, the thermoplastic plastic may be ultra-high molecular weight polyethylene. In addition, the metal member is selected from a group consisting of aluminum, iron, stainless steel, and alloys thereof.

The detailed technology and preferred embodiments implemented for the subject invention are described in the following paragraphs accompanying the appended drawings for people skilled in this field to well appreciate the features of the claimed invention.

DETAILED DESCRIPTION OF THE PREFERRED EMBODIMENT

Hereafter, examples will be provided to illustrate the embodiments of the present invention. Advantages and effects of the invention will become more apparent from the disclosure of the present invention. It should be noted that these accompanying figures are simplified and illustrative. The quantity, shape and size of components shown in the figures may be modified according to practical conditions, and the arrangement of components may be more complex. Other various aspects also may be practiced or applied in the invention, and various modifications and variations can be made without departing from the spirit of the invention based on various concepts and applications.

Embodiment 1

Figure 1:
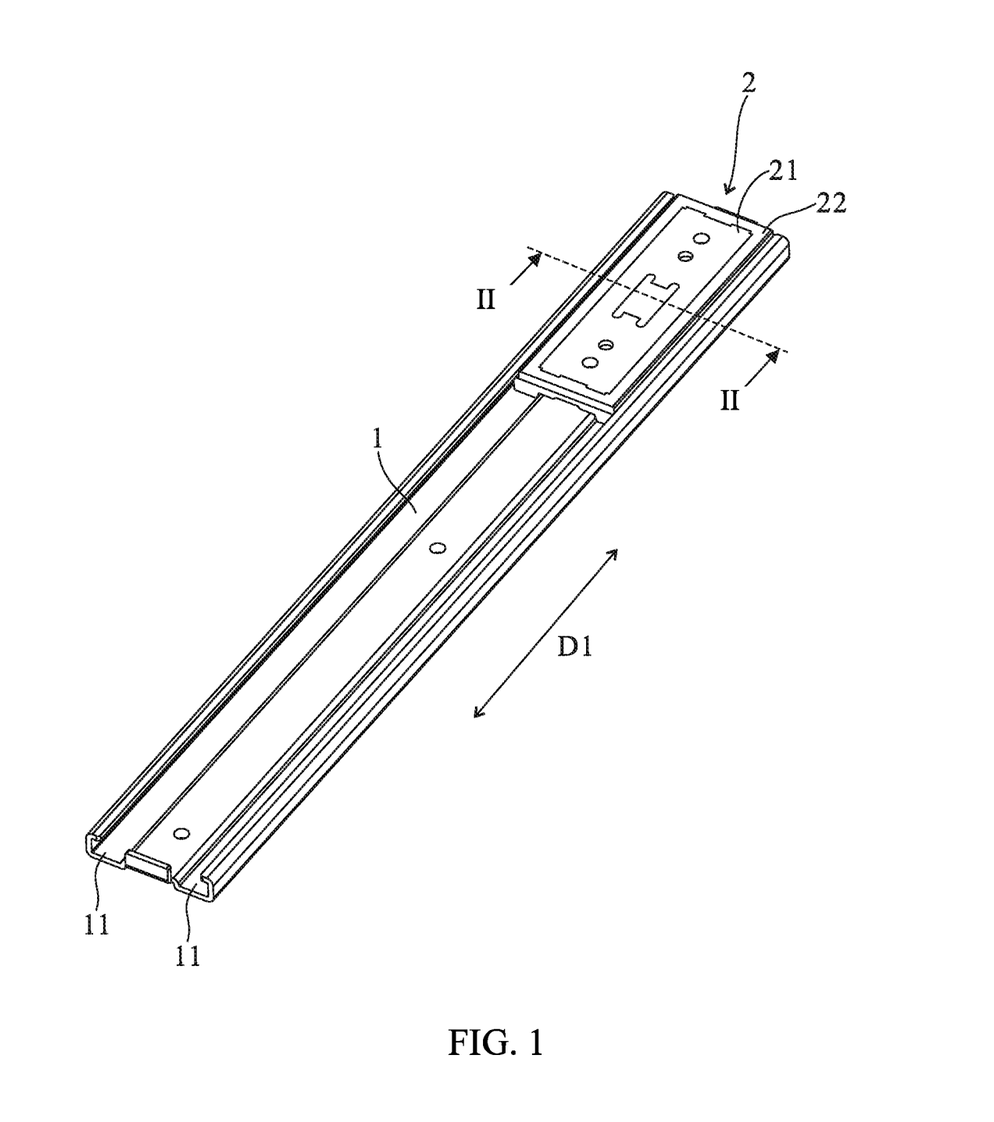
FIG. 1 is a perspective view of the slide module of embodiment 1 of the present invention.

The slide module 1000 of the present invention is illustrated in FIG. 1. The slide module 1000 comprises a rail 1 and a slider 2. The rail 1 extends along a longitudinal direction D1 with two sliding slots 11 formed at both sides of the rail 1. The slider 2 is slidably disposed in the rail 1 so that the slider 2 may slide along the longitudinal direction D1 corresponding to the rail 1 and contact with the sliding slots 11. The slider 2 comprises a metal member 21 and a plastic member 22, wherein the plastic member 22 covers at least a portion of the metal member 21 by injection molding and engages to a plurality of engaging structures (as shown in FIG. 4) of the metal member 21.

In the present embodiment, the metal member 21 is made of cold-pressed galvanized plate (SGSS), and the plastic member 22 is made of ultra-high molecular weight polyethylene (Lumber L5000; Mitsui).

Figure 2:
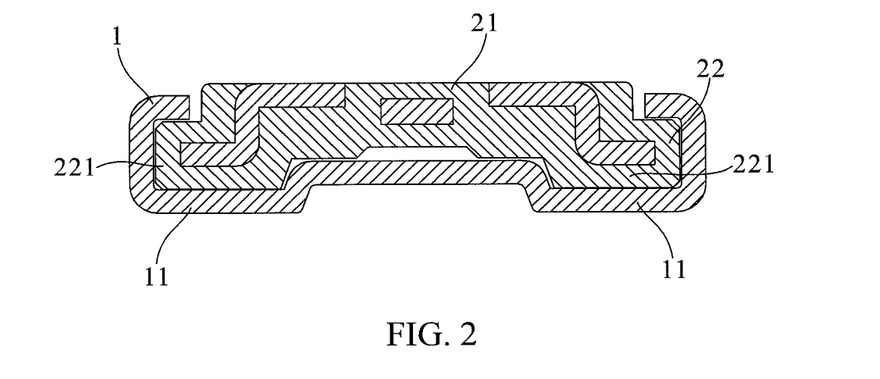
FIG. 2 is a cross-sectional view of II-II of FIG. 1.
Figure 3:
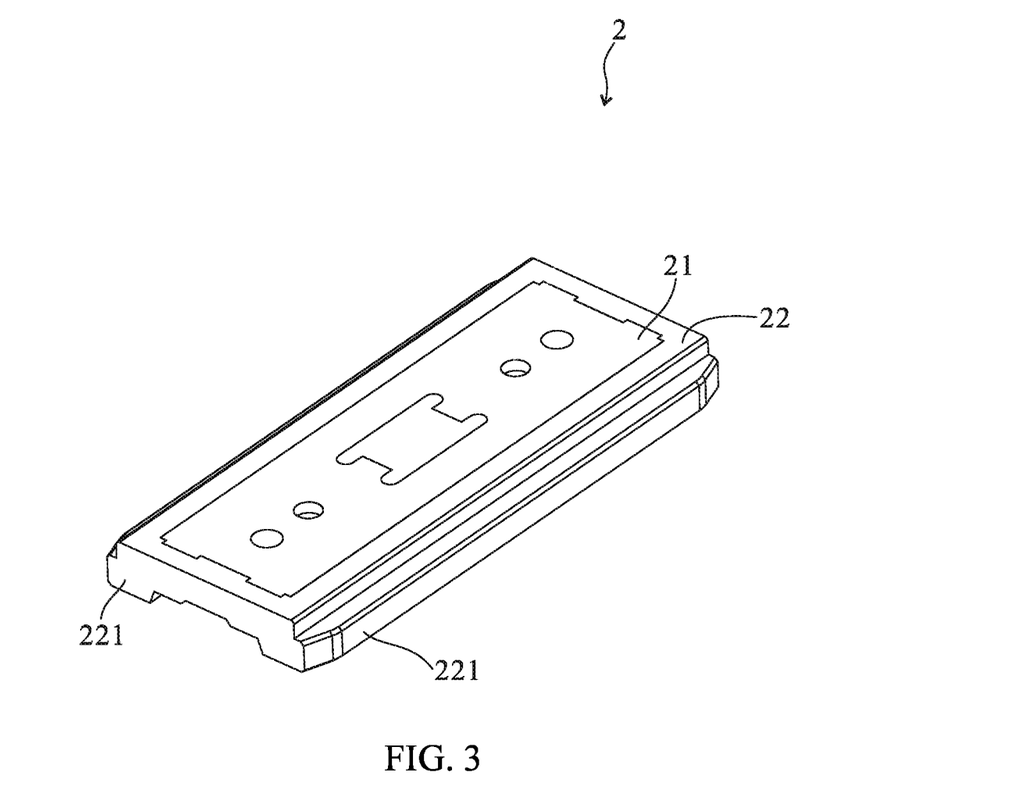
FIG. 3 is a perspective view of the slider of embodiment 1 of the present invention.

Refer to FIG. 2 and FIG. 3, wherein FIG. 2 is the cross-sectional view of the section line II-II in FIG. 1, and FIG. 3 is the perspective view of the slider 2. Specifically, the plastic member 22 of the slider 2 surrounds the periphery of the metal member 21, and includes two sliding bases 221 at both sides of the plastic member 22. The sliding bases 221 slidably engage to the sliding slots 11 of the rail 1 and the shape thereof conforms the inner contour of the rail 11. Hence, when the slider 2 slides correspondingly to the rail 1, the sliding bases 221 contact and rub the sliding slots 11. The slider 2 contacts the rail 1 with its plastic member 22, which has less friction, so that the slider 2 is able to smoothly slide along the rail 1.

Figure 4:
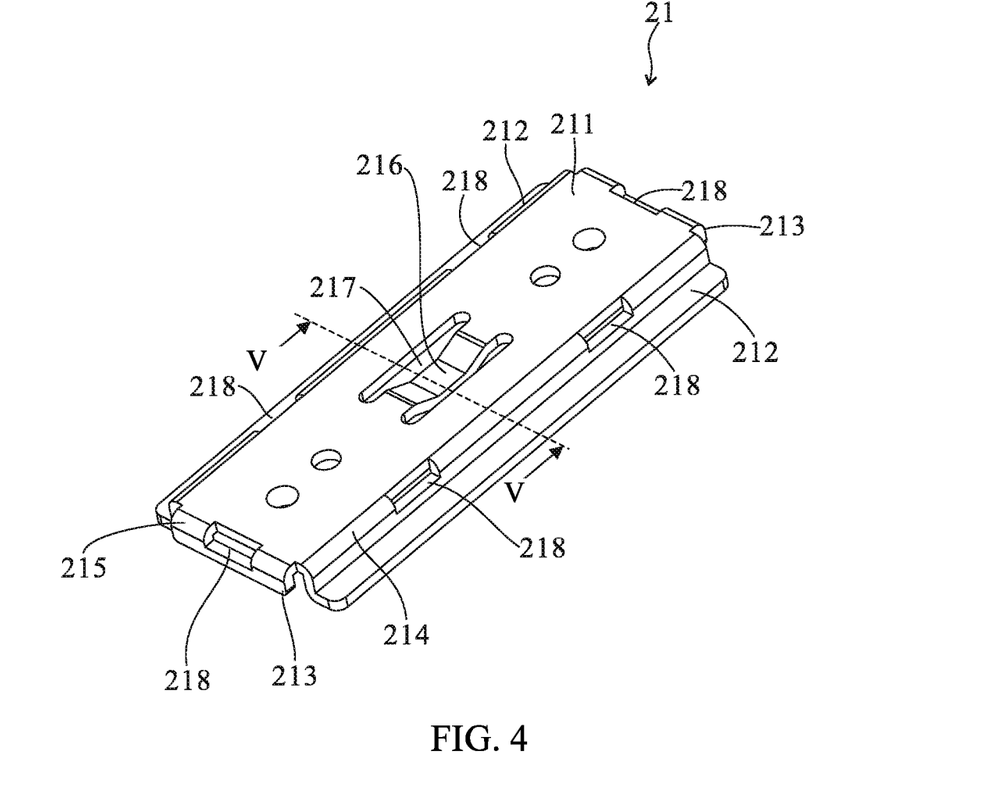
FIG. 4 is a perspective view of the metal member of the first embodiment of the present invention.
Figure 5:
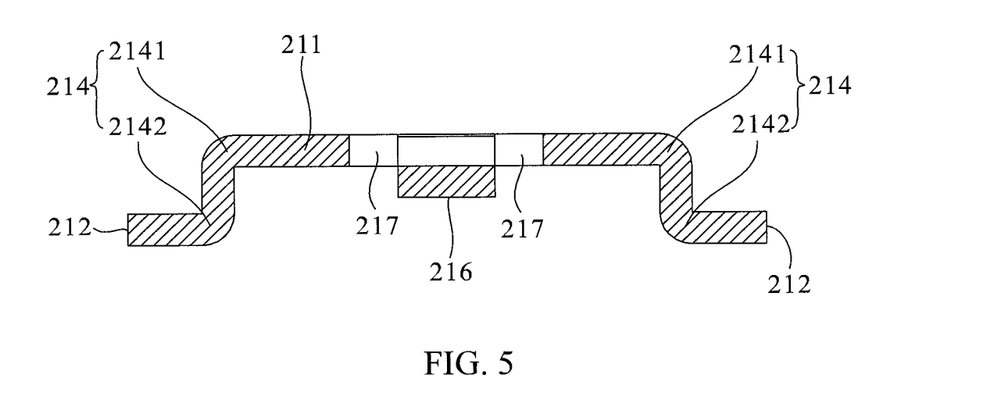
FIG. 5 is a cross-sectional view of V-V of FIG. 4.

Please refer to FIG. 4 and FIG. 5, wherein FIG. 4 is the perspective view of the metal member 21 of the slider 2, and FIG. 5 is the cross-sectional view of the section line V-V illustrated in FIG. 4. In detail, the metal member 21 has a main board 211, two long-side wings 212, and two short-side wings 213, wherein the long-side wings 212 extend along the longitudinal direction D1, the short-side wings 213 extend along a direction perpendicular to the longitudinal direction D1. Each of the long-side wings 212 includes a first bending part 214 respectively that extends along the longitudinal direction D1, wherein each of the bending parts 214 has two bending corners 2141, 2142. The bending corners 2141, 2142 of one of the long-side wings 212 bend in opposite angles so that the long-side wings 212 become parallel to the main board 211. Also, two through holes 218 are formed respectively on each of the bending corners 2141, which is adjacent to the main board 211, of the first bending parts 214. Further, each of the short-side wings 213 includes a second bending part 215 respectively which extends along a direction perpendicular to the longitudinal direction D1. Each of the second bending parts 215 has a bending corner so that the short-side wings 213 become perpendicular to the main board 211. Also, a through hole 218 is formed on each bending corner of the second bending parts 215. Moreover, a recess 216 formed on the main board 211 is recessed from one surface to another surface of the main board 211, and two square through holes 217 are formed on the edges of the recess 216. The aforementioned recess 216, through holes 218, and square through holes 217 are the engaging structures of the present invention, however, the number of the engaging structures is not limited thereto in other embodiments. The number, shape, size, and location of the engaging structure may be adjusted as desired.

The present invention is characterized in that the slider 2 is manufactured by injection molding method, which includes the steps of placing the metal member 21 in an injection mold and injecting the molten plastic material into the injection mold. When the molten plastic is injected into the injection mold, the plastic material covers and adheres to most of the metal member 21 and engaged tightly to the metal member 21 through the plural engaging structures, therefore, the plastic member 22 may firmly engage to the metal member 21.

Embodiment 2

Figure 6:
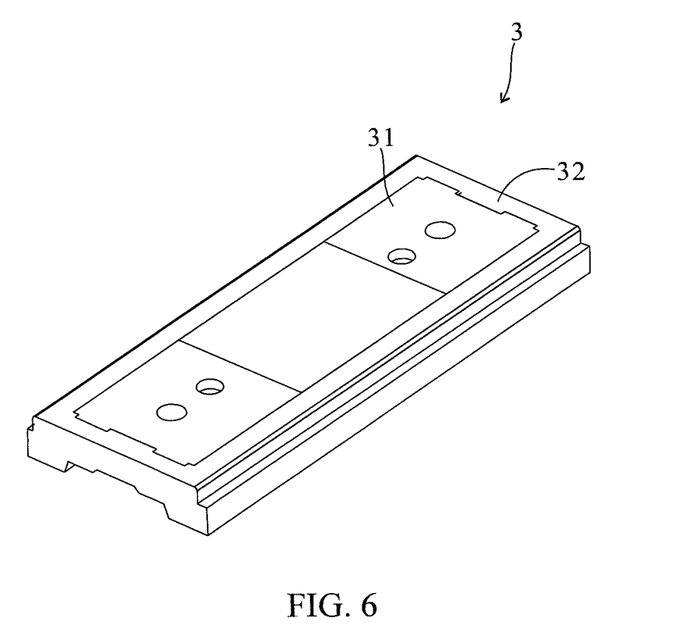
FIG. 6 is a perspective view of the slider of embodiment 2 of the present invention.
Figure 7:
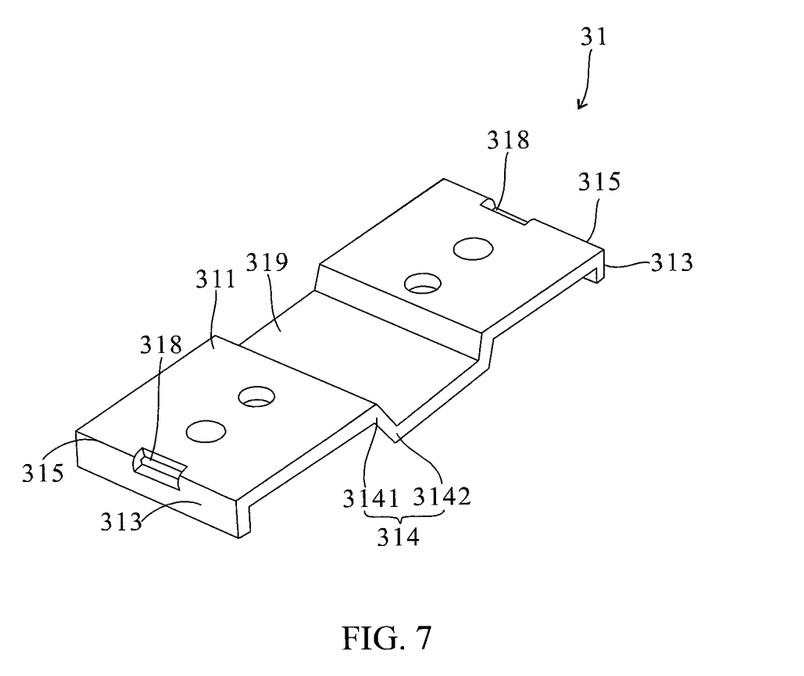
FIG. 7 is a perspective view of the metal member of embodiment 2 of the present invention.

The slide module of the present embodiment is similar to that of Embodiment 1, except that another metal member 31 which is applied in the present embodiment has a different type of engaging structure and bending part. The slider 3 of the present invention is illustrated in FIG. 6, wherein the metal member 31 is illustrated in FIG. 7. The metal member 31 includes a main board 311 and two short-side wings 313. Two third bending parts 314 are formed on the main board 311, and a fourth bending part 315 is formed on each of the short-side wings 313, wherein each of the third bending parts 314 includes two bending corners 3141, 3142 that bend in opposite angles so that a recess 319 is formed at the center portion of the main board 311. In addition, each of the fourth bending parts 315 has a bending corner so that the short-side wings 313 become perpendicular to the main board 311. Further, a through hole 318 is formed on each of the fourth bending parts 315. The aforementioned recess 319 and the through holes 318 are the engaging structures of the present invention, and similarly, when the slider 3 is manufactured by injection molding method, the plastic member 32 may firmly engage to the metal member 31. In other embodiments, the number of the engaging structure is not limited thereto. The number, shape, size, and location of the engaging structure may be adjusted and designed as desired.

Embodiment 3

Figure 8:
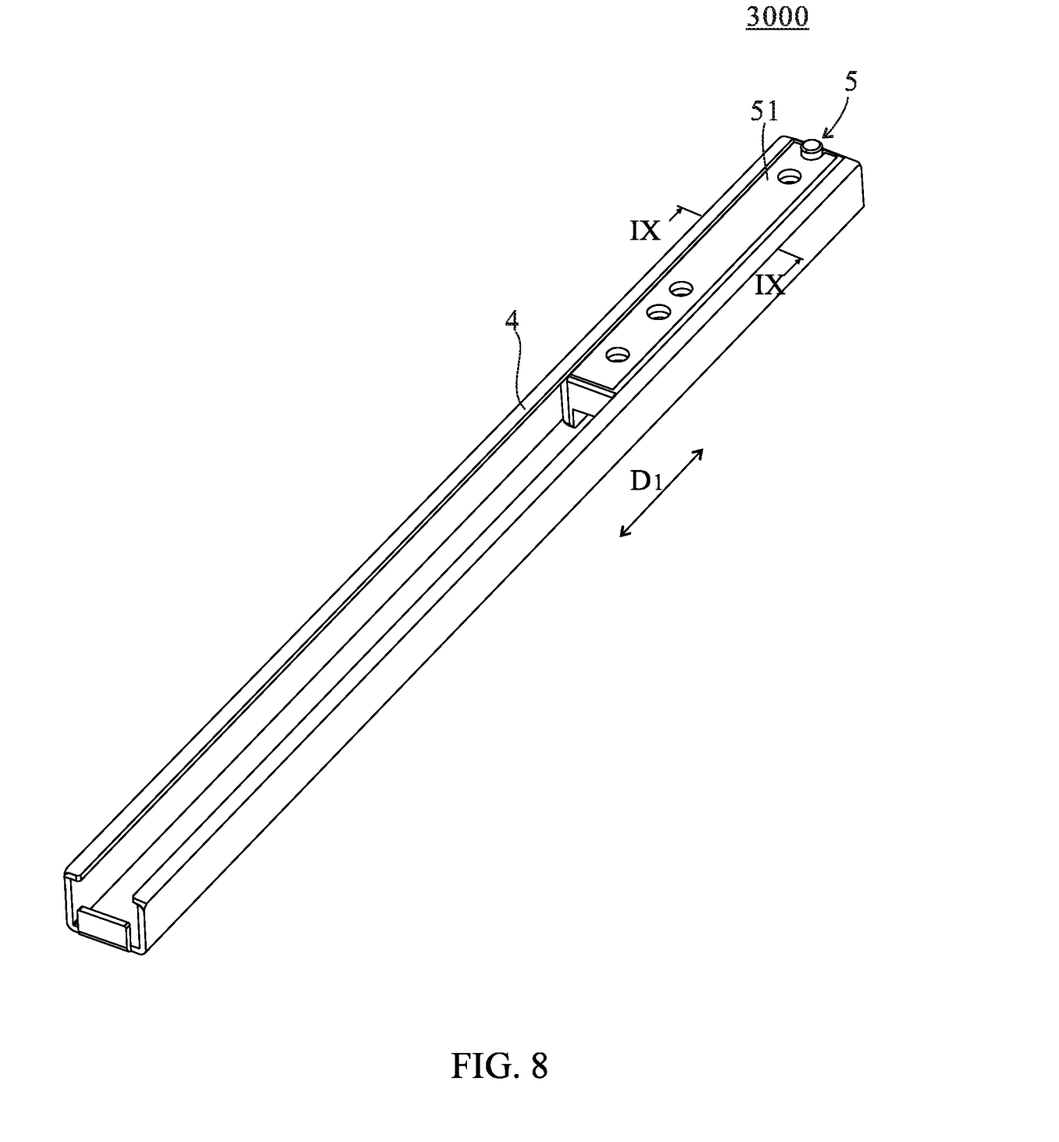
FIG. 8 is a perspective view of the slide module of embodiment 3 of the present invention.

The slide module 3000 of the present embodiment is illustrated in FIG. 8. The slide module 3000 comprises a rail 4 and a slider 5, wherein the rail 4 is a U-shape rail 4 that extends along a longitudinal direction D1 for receiving the slider 5. The slider 5 is slidably disposed in the rail 4 so that the slider 5 may contact with and slide along the longitudinal direction D1 correspondingly to the rail 4. The slider 5 includes a metal member 51 and a plastic member 52, wherein the slider 5 is manufactured by injection molding with its plastic member 52 covering at least a portion of the metal member 51.

Figure 9:
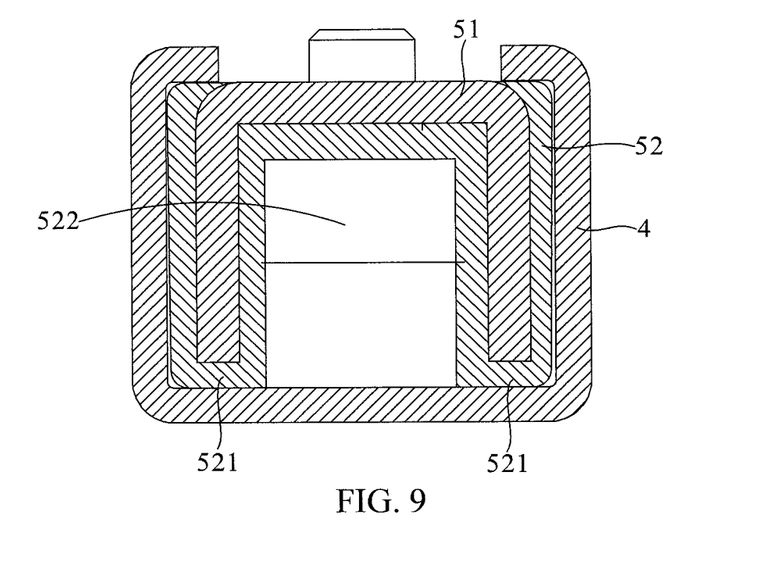
FIG. 9 is a cross-sectional view of IX-IX of FIG. 8.

Please refer to FIG. 9 which is the cross-sectional view of the section line IX-IX in FIG. 8. Particularly, the plastic member 52 of the slider 5 surrounds the periphery of the metal member 51 and includes two sliding bases 521 at both sides of the plastic member 52 along the longitudinal direction D1. Hence, when the slider 5 slides correspondingly along the rail 4, the sliding bases 521 contact and rub the rail 4, and because the slider 5 contacts the rail 4 with its plastic member 52, which has less friction, the slider 5 may smoothly slide back and forth in the rail 4.

Figure 10:
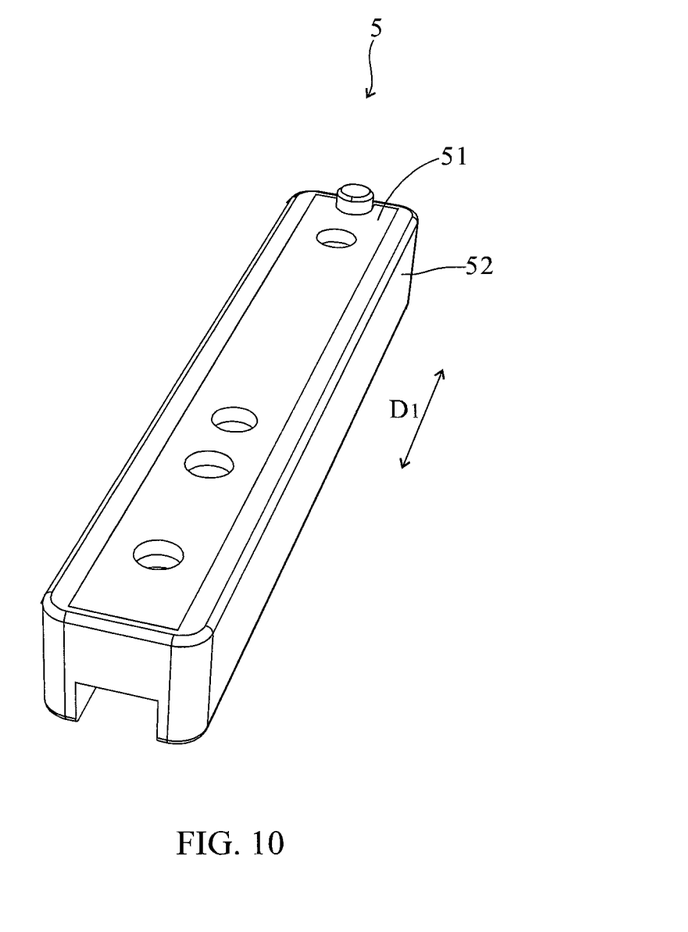
FIG. 10 is a perspective view of the slider of embodiment 3 of the present invention.
Figure 11:
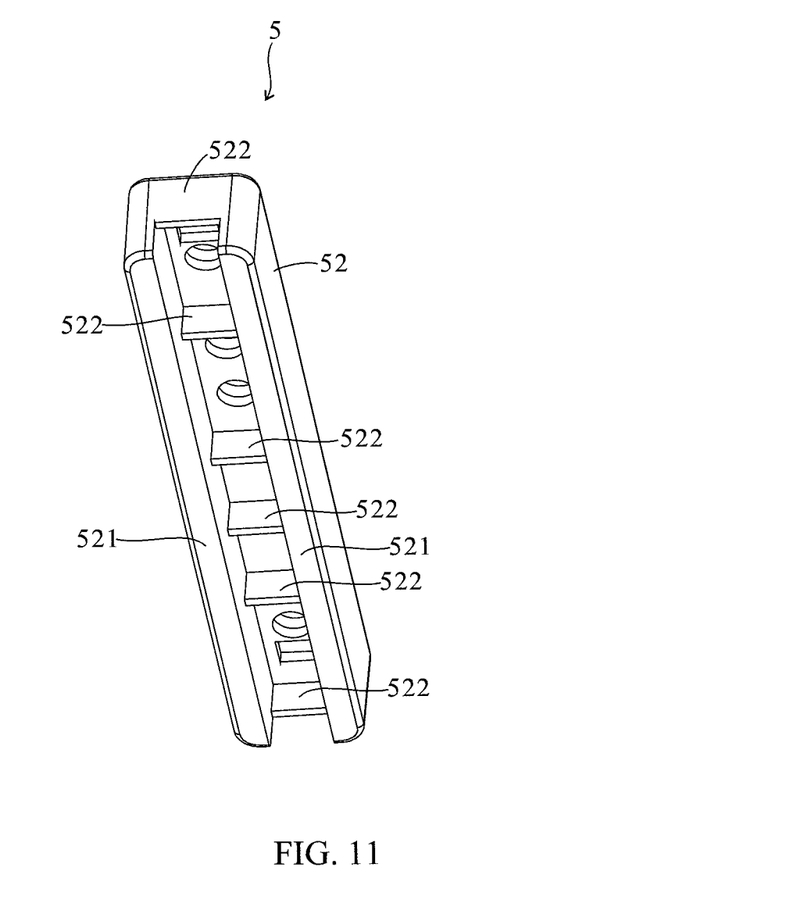
FIG. 11 is a perspective view of the slider of embodiment 3 of the present invention.

Please refer to FIG. 10 and FIG. 11, wherein FIG. 10 is the perspective view of the slider 5, and FIG. 11 is another perspective view of the slider 5. The slider 5 has a U-shape cross-section with six enhancing plates 522 disposed between the sliding bases 521 for reinforcing the strength of the slider 5.

Figure 12:
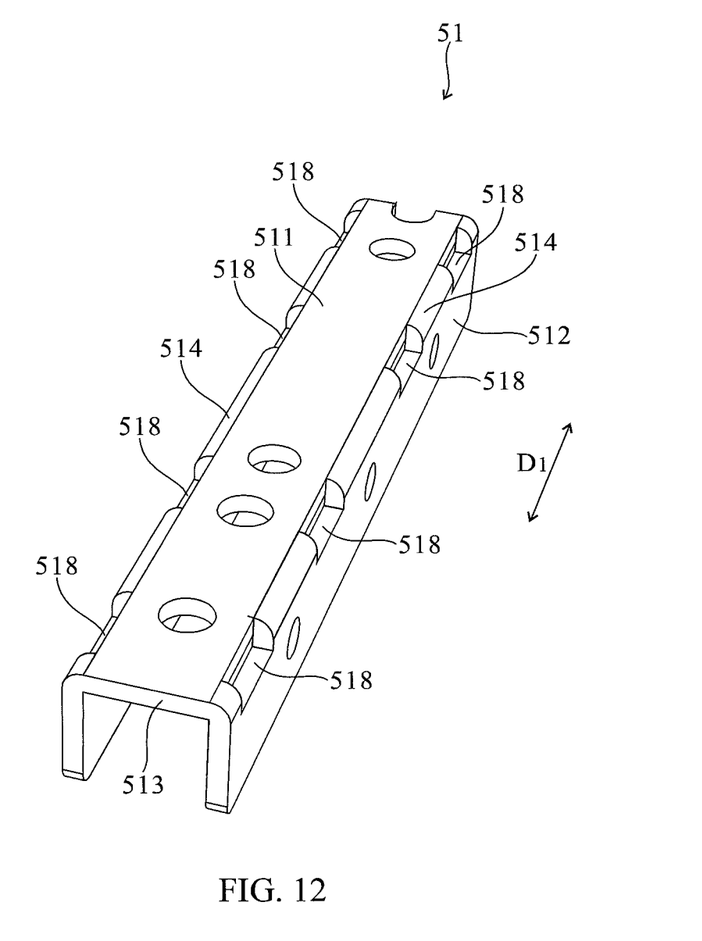
FIG. 12 is a perspective view of the metal member of embodiment 3 of the present invention.

Further, please refer to the metal member 51 illustrated in FIG. 12. Specifically, the metal member 51 includes a main board 511 and two long-side wings 512 extending along the longitudinal direction D1. The main board 511 includes two fifth bending parts 514 extending along the longitudinal direction D1, and each of the fifth bending parts 514 comprises a bending corner so that the long-side wings 512 become perpendicular to the main board 211. Four through holes 518 formed on each of the fifth bending parts 514 are the engaging structures of the present invention. However, the number of the engaging structures in other embodiments is not limited thereto, and the number, shape, size, and location of the engaging structure may also be adjusted and designed as desired.

Similarly, the present invention is characterized in that the slider 5 is manufactured by injection molding method, which includes the steps of placing the metal member 51 in an injection mold, and injecting the molten plastic material into the injection mold. When the molten plastic material is injected into the injection mold, the plastic material covers and adheres to most of the metal member 51 and engaged tightly to the metal member 51 through the plural engaging structures, therefore the plastic member 52 may firmly engage to the metal member 51.

According to the aforementioned description, the slider is manufactured by injection molding in the present invention, which comprises the steps of placing the metal member in the injection mold, and injecting the plastic material into the mold to cover the metal member. The plastic member may firmly engage to the metal member through the engaging structure so that the whole slider is stable and firm. Accordingly, the plastic member with high hardness is not particular needed for preventing cracks formed thereon due to different hardness between the plastic material and the metal when a force is applied to the slider. Also, the plastic material with lower hardness has a lower melting point, therefore, the injection molding process may be performed at a relatively lower process temperature (about 200~220° C.). Therefore, the production cost may be significantly decreased and the manufacturing step may also be simplified. In the slide module, the low friction between the plastic member and the rail provides the self-lubricating function for the slider to smoothly slide along the rail without applying the lubricating oil or disposing the balls. In summary, the production cost of the slide module of the present invention may be significantly decreased and the manufacturing step thereof may also be simplified.

Although the present invention has been explained in relation to its preferred embodiment, it is to be understood that many other possible modifications and variations can be made without departing from the spirit and scope of the invention as hereinafter claimed.

What is claimed is:

1. A slider of a slide module, wherein the slider is slidably disposed in a rail extending in a longitudinal direction, the slider comprising:
   a metal member, including a main board, two long-side wings, and two short-side wings, and at least one engaging structure, wherein the engaging structure is a groove, a notch, a protrusion, a through hole, or combinations thereof that formed on the main board, the long-side wings, or the short-side wings; and
   a plastic member, binding to the metal member by injection molding, covering at least a portion of the metal member, and being embedded in the engaging structure to firmly engage to the metal member;
   wherein the plastic member of the slider contacts the rail so that the slider is able to slide along the longitudinal direction with respect to the rail.

2. The slider as claimed in claim 1, wherein the metal member further includes at least one bending part formed on the main board, the long-side wings, or the short-side wings, wherein the bending part includes at least one bending corner.

3. The slider as claimed in claim 2, wherein the main board includes a recess which is recessed from one surface to another surface of the main board.

4. The slider as claimed in claim 3, wherein two engaging structures are formed on each side of the recess parallel to the long-side wing respectively, wherein the engaging structures are the through holes.

5. The slider as claimed in claim 3, wherein when the bending part is formed on the long-side wing, the bending part extends along the longitudinal direction.

6. The slider as claimed in claim 3, wherein when the bending part is formed on the short-side wing, the bending part extends along a direction perpendicular to the longitudinal direction.

7. The slider as claimed in claim 3, wherein the engaging structure is formed on the bending part.

8. The slider as claimed in claim 7, wherein the engaging structure is the through hole.

9. The slider as claimed in claim 1, wherein the plastic member is formed of a thermoplastic plastic.

10. The slider as claimed in claim 9, wherein the thermoplastic plastic is at least one selected from the group consisting of polyaryletherketone, polyethylene, and modified polyethylene.

11. The slider as claimed in claim 1, wherein the metal member is made of a material selected from a group consisting of aluminum, iron, stainless steel, and alloys thereof.

* * * * *